May 12, 1953 D. G. GRISWOLD 2,638,127
MOLDED DIAPHRAGM STRUCTURE
Original Filed Sept. 9, 1943 2 Sheets-Sheet 1
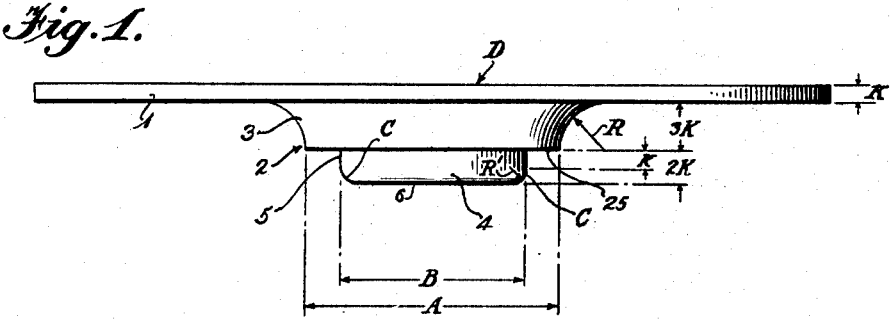
Fig. 1.
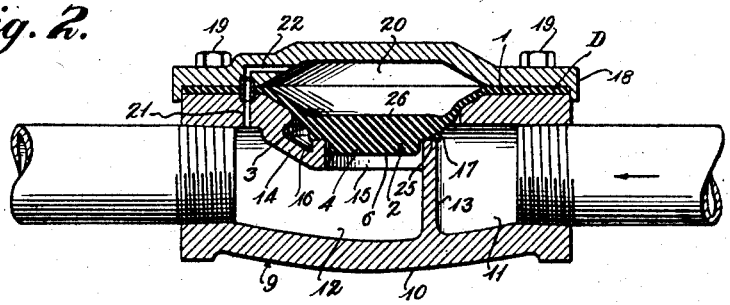
Fig. 2.
Fig. 3.
Fig. 4.
Fig. 5.
Inventor
Donald G. Griswold
By Bacon & Thomas
Attorneys May 12, 1953   D. G. GRISWOLD   2,638,127
MOLDED DIAPHRAGM STRUCTURE
Original Filed Sept. 9, 1943   2 Sheets-Sheet 2
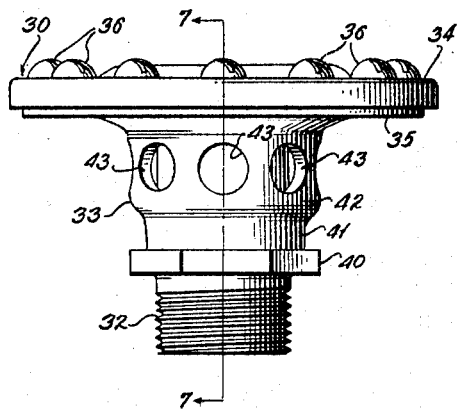
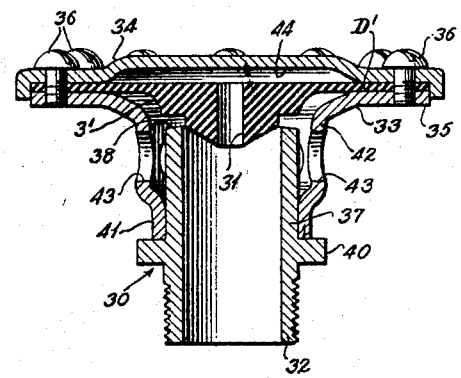
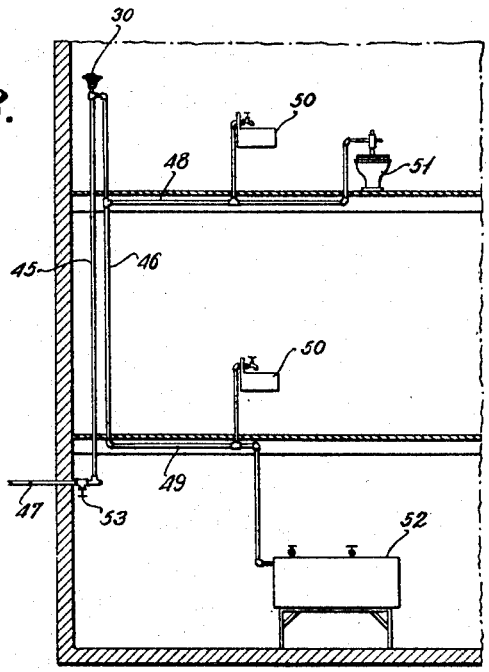
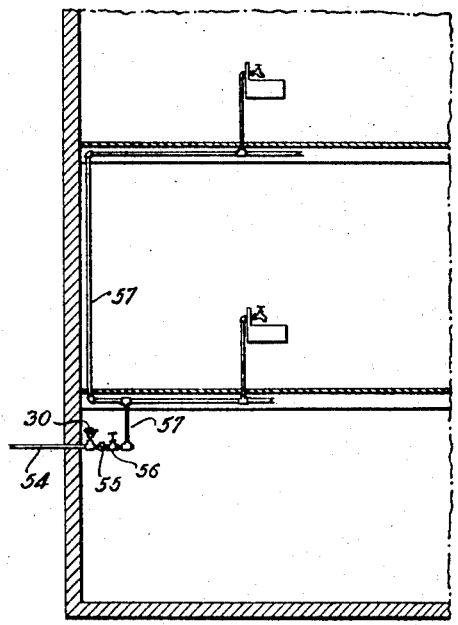
Inventor
Donald G. Griswold
By Bacon & Thomas
Attorneys Patented May 12, 1953

2,638,127

UNITED STATES PATENT OFFICE 2,638,127

MOLDED DIAPHRAGM STRUCTURE

Donald G. Griswold, Alhambra, Calif., assignor to Clayton Manufacturing Company, Alhambra, Calif., a corporation of California Original application September 9, 1943, Serial No. 501,701. Divided and this application January 16, 1946, Serial No. 641,421

7 Claims. (Cl. 137—793)

The present invention relates to a novel molded diaphragm structure adapted for general use in valves, siphon breakers, etc.

One of the novel features of the present diaphragm is that it includes a "button" integrally formed therewith of such shape and configuration as to cooperate with an annular seat to effect quiet sealing and thus eliminate the usual noise and chattering commonly encountered with conventional diaphragm structures.

Another feature of the diaphragm is that the body and button may be reinforced with fabric, if desired, and made of rubber or "neoprene" having a predetermined, desired Shore scleroscope hardness. In certain instances, the main body portion of the diaphragm may be made of "neoprene" or rubber of one hardness and the "button" of another hardness.

For the purpose of illustrating the adaptability of the present diaphragm for various uses, the same is disclosed herein in connection with an automatic check valve and with an automatic vacuum or siphon breaker. One of the principal advantages of the present diaphragm in valve structures is that it eliminates the usual valve stem, clamping plates, valve stem guides, etc., and, being devoid of the usual valve stem opening, it eliminates the difficulties encountered in conventional valves when used with, for example, high air pressures, because it prevents the air from infiltrating into and through the body of the diaphragm and causing leakage.

The principal object of the invention is to provide a molded diaphragm structure adapted for general use in valves, etc., wherein the diaphragm includes a portion which directly engages a seat and cooperates with said seat and the opening therein to produce quiet operation.

Other objects and advantages of the invention will be apparent from the following description, taken in conjunction with the accompanying drawings, in which:

Fig. 1 is an enlarged elevational view of a diaphragm constructed in accordance with the principles of the invention;

Fig. 2 is a longitudinal sectional view through an automatic check valve containing a diaphragm such as shown in Fig. 1;

Figs. 3, 4 and 5 are diagrammatic views illustrating the novel coaction between the diaphragm button and an annular seat during the downward flexing of the diaphragm, and whereby chattering, squealing and other noises incident to closing are eliminated;

Fig. 6 is an elevational view of an automatic siphon breaker including a diaphragm embodying the principles of the present invention;

Fig. 7 is a transverse sectional view taken on the line 7—7 of Fig. 6;

Fig. 8 is a diagrammatic view illustrating the manner in which the siphon breaker shown in Figs. 6 and 7 may be installed in a pipe system of a house or other building to prevent back-siphoning; and Fig. 9 is a view similar to Fig. 8 but showing a modified piping installation.

Referring now to Fig. 1, the diaphragm is generally indicated by the letter D and includes a circular body portion 1 provided with a relatively thick, integral, central button 2 consisting of a circular boss 3 and a circular protuberance or mound 4 formed upon said boss. The thickness of the body portion 1 is indicated by the letter K and the thickness of the boss 3 is indicated by the dimension 3K inasmuch as said boss is approximately three times as thick as the body portion 1. The periphery of the boss 3 is merged with the body portion 1 along an arc defined by a radius R which is equal to 3K, the axial thickness of said boss. The protuberance or mound 4 is indicated as having a thickness 2K; that is, about twice as thick as the body portion 1. Half the height of the mound 4, indicated by the dimension K, constitutes a cylindrical portion 5, whereas the remainder of the periphery of the mound 4 is curved upon an arc C having a radius R' equal to the dimension K. The lower side of the mound 4 is flat as indicated at 6.

The diaphragm D may be made of rubber but is preferably made of "neoprene" having a Shore scleroscope hardness of 60 to 80. "Neoprene" is preferred to rubber because it will not stick to a brass seat, whereas, rubber as it ages, has a tendency to do so. The body 1, and the button 2 may be reinforced with laminated fabric (not shown) if desired, in order to add strength thereto. For certain small valves, the body portion 1 and the button 2 will both be made of a hardness of 60, as measured by the Shore scleroscope. For larger types of valves, the body 1 will have a hardness of about 60 and the button 2 will have a hardness of about 80. Of course, the body 1 may be made of a hardness ranging from 60 to 80, as may also the button 2. The foregoing range of Shore scleroscope hardness of 60 to 80 provides a diaphragm structure of the desired flexibility conducive to the mode of coaction with a cooperating seat described hereinafter.

Fig. 2 shows the manner in which the diaphragm D may be incorporated in an automatic check valve. The check valve is generally indicated by the numeral 9 and includes a body 10 having an inlet opening 11 and an outlet opening 12 separated by a partition wall including a vertical portion 13 and an inclined wall portion 14 which are merged to provide a circular opening 15 between the chambers 11 and 12. The opening 15 is surrounded by an upwardly projecting flange 16, the upper annular surface 17 of which forms a seat cooperable with the button 2 of the diaphragm D. The surface 17 may be made flat, but better results are obtained if the same is slightly inclined downwardly and outwardly on an angle of about 5° to the horizontal, as shown in Fig. 3.

The diaphragm D is disposed between the valve body 10 and a cover plate 18 secured to the body by a suitable number of machine screws 19. The cover 18 is dished to provide a pressure chamber 20 above the diaphragm 1. Communication between the outlet opening 12 and the diaphragm pressure chamber 20 is established by a passageway 21 in the valve body 10, which communicates with a passageway 22 in the cover 18 opening into the pressure chamber 20. It will be apparent that, as the pressure builds up on the outlet side 12 of the valve 9, such pressure will be communicated through the passageways 21 and 22 to the pressure chamber 20 and cause downward flexing of the diaphragm D to cut off flow between the chambers 11 and 12. In this manner, the check valve 9 automatically closes in response to changes in pressure in the outlet chamber 12. It will also be apparent that, as the pressure drops in the outlet chamber 12, the diaphragm D will be raised from its seat 17 by the pressure in the inlet chamber 11, and raising of the diaphragm will cause the fluid in the pressure chamber 20 to be forced out of said chamber through the passageways 22 and 21 back into the outlet chamber 12, to eventually permit full opening of the valve.

The mound 4 has a diameter indicated by the letter B, which for a 1½" valve is about 0.02 to 0.03 of an inch less than the diameter of the seat opening 15. The diameter of the lower face 25 of the boss 3 is indicated by the dimension A and preferably is slightly larger than the outside diameter of the seat 17.

The novel manner in which the diaphragm D cooperates with the seat 17 during closing of the valve is diagrammatically illustrated in Figs. 3 to 5, the clearances being exaggerated to facilitate illustration. Fig. 3 shows the body 1 of the diaphragm D substantially flat and when in this condition the lower face 25 of the boss 3 lies in a horizontal plane parallel with that of the plane of the body 2 with the mound 4 disposed above the seat 17. As the diaphragm D is flexed downwardly due to the increasing pressure in the chamber 20, the central portion of said diaphragm is flexed downwardly out of a horizontal plane and is caused to assume the somewhat dished contour indicated at 26 in Fig. 4. The mound 4 enters the opening 15 and the lower face 25 of the boss 3 is caused to assume a slight angle to the horizontal, the portions defined by the arcs C being flexed slightly outwardly into closer proximity with the inner surface of the opening 15. The curvature of the arcs C gradually constricts the flow between the inlet and outlet chambers 11 and 12 of the valve as the mound 4 further enters the opening 15. At the same time, the surface 25 is approaching the inclined face 17 of the valve seat so that, while there is a constriction of flow at this point, all objectionable eddying is avoided. One of the peculiar characteristics of the present diaphragm construction is that, as the annular face 25 of the boss 3 approaches the seat 17, it does not simultaneously form a line-contact with all portions of the edge of said seat, but on the other hand will first engage said edge at a point 27 (Fig. 5) at one side of the seat and gradually and progressively engage the remainder of said edge on both sides of said point until final and complete contact is made at a point substantially diametrically opposite the initial point of engagement. Fig. 5 shows the seat 17 contacted by the boss 3 for about half-way around its periphery. Thus, the protuberance or mound 4 enters the seat opening 15 axially to gradually constrict the flow through the seat opening and, while this is being done, the surface 25 is approaching the seat 17 and upon engagement therewith gradually cuts off flow circumferentially through the opening 15. It is such gradual constriction and cutting off of flow through the opening 15 (due to the gradual axial and circumferential restriction of flow through said opening 15), which results in the unusual quiet operation of the diaphragm. Moreover, it is the predetermined flexibility of the diaphragm D within the scleroscope hardness rang of 60 to 80 and the specific shape of the button 2 which permit such coaction.

Referring now to Figs. 6 and 7, a modified diaphragm D', similar to the diaphragm D, except that it is provided with a central passageway 31, is incorporated in a siphon breaker generally indicated by the numeral 30. The siphon breaker 30 includes a hollow cylindrical mounting element 32, and a body comprising a hood 33 and a cover plate 34. The diaphragm D' is clamped between the cover 34 and a horizontal flange 35 on the hood 33, said hood and cover being secured together by a suitable number of screws 36. The mounting member 32 includes a cylindrical portion 37 projecting upwardly into the hood 33 and terminating at its upper end in an inclined face 38 adapted to serve as an annular seat for a boss 3' on the diaphragm D'. The mounting member 32 includes an intermediate hexagonal flange 40 against which a lower reduced end 41 of the hood 33 is adapted to engage. The inner surface of the portion 41 snugly engages the outer periphery of the cylindrical portion 37 and the hood 33 is preferably mounted on the mounting member 32 by sweating the portion 41 onto the portion 37, although it will be understood that other means of securing the hood to the portion 37 can be employed. The hood 33 has an enlarged portion 42 adjacent the reduced end 41 provided with a series of vent openings 43, the total area of which is at least as great as the area of the opening surrounded by the annular seat 38. The cover 34 is dished as indicated at 44 to provide a pressure chamber above the diaphragm D'.

Fig. 8 diagrammatically illustrates the manner in which the vacuum breaker 30 shown in Figs. 6 and 7 may be installed in a piping system associated with a dwelling or other building. It will be understood that the vacuum breaker 30 may be mounted at each plumbing fixture, but for the sake of economy only one need be used and can be conveniently mounted at the highest point in the line supplying water to the dwelling or building. Thus, in Fig. 8 the vacuum breaker 30 is mounted at the highest point between two vertical pipe lines 45 and 46. The line 45 is connected with a supply pipe 47 and the line 46 is connected by branch lines 48 and 49 with various plumbing fixtures in the building such as wash basins 50, toilet 51, and a stationary tub 52. A shut off valve 53 is connected in the service line 47.

In operation, so long as there is any pressure in the line 45, fluid will flow through the passageway 31 in the diaphragm D' into the chamber 44, and as the pressure in said chamber builds up, the diaphragm D' will be flexed downwardly to engage the seat 38 (in the same manner described in connection with the valve of Fig. 2) to automatically seal off the upper end of the mounting member 32 from the atmosphere. The siphon breaker 30 will remain closed so long as the pressure in the line 45 is above atmospheric pressure. However, if the pressure in the line 45 drops below atmospheric pressure for any reason, the fluid from the chamber 44 will flow back through the passageway 31 in the diaphragm D' into the pipe line 45, and atmospheric pressure effective through the vent openings 43 will act upon the lower side of the diaphragm D' and flex it upwardly out of contact with the seat 38 and thus vent the pipe 45 to the atmosphere and prevent the formation of any vacuum therein which would tend to cause back-siphoning of liquid from the basin 50, toilet 51 and tub 52. In this manner, all possible contamination of the water in the line 45, supply pipe 47 and any main connected with said supply pipe is avoided, as is also any damage that might result by water rushing back into the line 45 if the vacuum were not broken.

Fig. 9 illustrates a modified piping system including the siphon breaker 30 in which said siphon breaker is not connected in the system at the highest point thereof. Thus, the siphon breaker 30 is shown connected directly in a supply line 54. A check valve 55, which may be of conventional construction, is connected on the building side of the siphon breaker 30 and a conventional globe or gate shut off valve 56 is connected in the line 54 on the inlet side of the check valve 55. Water from the supply pipe 54 is supplied to the various fixtures in the building through a riser 57. In this system, if the pressure should fail in the supply pipe 54, the siphon breaker 30 will automatically open and connect the supply line 54 with the atmosphere in the same manner described in connection with Fig. 8. Moreover, the check valve 55 will prevent the water in the riser 57 and other piping in the dwelling from flowing back into supply line 54. The check valve 55 alone would prevent objectionable back-siphoning, but would not relieve any vacuum condition that might be created in the service line 54. On the other hand, the siphon breaker 30 avoids all possibility of producing a vacuum in the supply line 54 and the dangers incident thereto.

This application is a division of my copending application Serial No. 501,701, filed September 9, 1943, and which has now matured into Patent 2,394,911.

It will be understood that the diaphragm disclosed herein is not limited to use in valves and siphon breakers but is adapted for general utility. It will also be apparent that various changes may be made in certain details of construction of the valve and siphon breaker per se, without departing from the spirit of the invention or the scope of the annexed claims.

I claim:

1. A neoprene diaphragm comprising: a flat disc-like body portion; an integral boss on said body portion, said boss being substantially less flexible than said body portion and including a portion adapted to engage an annular seat and a central integral protuberance on said boss adapted to be received within the opening in said annular seat to constrict flow therethrough before said annular surface portion engages said seat, said body portion having a Shore sclerosope hardness of about 60 and said boss and protuberance having a Shore sclerosope hardness of about 80.

2. A diaphragm comprising: a substantially circular flexible body; a substantially circular relatively rigid central boss formed integral with said body and having the peripheral wall thereof merged into said body upon an arc, said boss including an annular marginal surface adapted to engage an annular seat, and a protuberance on said boss within the peripheral limits of said annular seat-engaging portion, said protuberance including a cylindrical portion and a flat lower end face, said cylindrical portion being merged at its periphery with said end face by a rounded corner, said annular seat engaging portion being adapted, under flexing movement of said diaphragm, to first engage the seat at one point and then to gradually and progressively engage the remainder of the seat on both sides of said point until complete contact all the way around the seat is made.

3. A diaphragm comprising: a substantially circular flexible body; a substantially circular relatively rigid central boss formed integral with said body, said boss having a thickness approximately three times as great as the thickness of said circular body, the peripheral wall of said boss merging with said body upon an arc having a radius substantially equal to the thickness of said boss, said boss including an annular surface on the lower side thereof adapted to engage an annular seat and a protuberance on said boss within the peripheral limits of said annular seat-engaging portion, said protuberance including a cylindrical portion having a thickness of approximately twice that of the thickness of said body, said cylindrical portion terminating in a flat lower end face, the lower corner of said cylindrical portion being rounded upon an arc having a radius substantially equal to that of the thickness of said body, said annular seat engaging portion being adapted, under flexing movement of said diaphragm, to first engage the seat at one point and then to gradually and progressively engage the remainder of the seat on both sides of said point until complete contact all the way around the seat is made.

4. A diaphragm comprising: a substantially circular flexible body; a substantially circular relatively rigid central boss formed integral with said body, said boss having a thickness approximately three times as great as the thickness of said circular body, the peripheral wall of said boss merging with said body upon an arc having a radius substantially equal to the thickness of said boss, said boss including an annular surface on the lower side thereof adapted to engage an annular seat and a protuberance on said boss within the peripheral limits of said annular seat-engaging portion, said protuberance including a cylindrical portion having a thickness of approximately twice that of the thickness of said body, said cylindrical portion terminating in a flat lower end face, the lower corner of said cylindrical portion being rounded upon an arc having a radius substantially equal to that of the thickness of said body, said diaphragm being made of neoprene and having a Shore scleroscope hardness of 60 to 80, said annular seat engaging portion being adapted, under flexing movement of said diaphragm, to first engage the seat at one point and then to gradually and progressively engage the remainder of the seat on both sides of said point until complete contact all the way around the seat is made.

5. A diaphragm comprising: a substantially circular flexible body; a substantially circular relatively rigid central boss formed integral with said body and having the peripheral wall thereof merged into said body upon an arc, said boss including an annular marginal surface adapted to engage an annular seat and a protuberance on said boss within the peripheral limits of said annular seat-engaging portion, said protuberance including a cylindrical portion and a lower end face, said cylindrical portion being merged at its periphery with said end face by a rounded corner, said annular seat engaging portion being adapted, under flexing movement of said diaphragm, to first engage the seat at one point and then to gradually and progressively engage the remainder of the seat on both sides of said point until complete contact all the way around the seat is made.

6. A diaphragm comprising: a substantially circular flexible body; a substantially circular relatively rigid central boss formed integral with said body, said boss having a thickness approximately three times as great as the thickness of said circular body, the peripheral wall of said boss merging with said body upon an arc having a radius substantially equal to the thickness of said boss, said boss including an annular surface on the lower side thereof adapted to engage an annular seat and a protuberance on said boss within the peripheral limits of said annular seat-engaging portion, said protuberance including a cylindrical portion having a thickness of approximately twice that of the thickness of said body, said cylindrical portion terminating in a lower end face, the lower corner of said cylindrical portion being rounded upon an arc merging into said lower end face and having a radius substantially equal to that of the thickness of said body, said annular seat engaging portion being adapted, under flexing movement of said diaphragm, to first engage the seat at one point and then to gradually and progressively engage the remainder of the seat on both sides of said point until complete contact all the way around the seat is made.

7. A diaphragm comprising: a substantially circular flexible body; a substantially circular relatively rigid central boss formed integral with said body, said boss having a thickness approximately three times as great as the thickness of said circular body, the peripheral wall of said boss merging with said body upon an arc having a radius substantially equal to the thickness of said boss, said boss including an annular surface on the lower side thereof adapted to engage an annular seat and a protuberance on said boss within the peripheral limits of said annular seat-engaging portion, said protuberance including a cylindrical portion having a thickness of approximately twice that of the thickness of said body, said cylindrical portion terminating in a lower end face, the lower corner of said cylindrical portion being rounded upon an arc merging into said lower end face and having a radius substantially equal to that of the thickness of said body, said diaphragm being made of neoprene and having a Shore scleroscope hardness of 60 to 80, said annular seat engaging portion being adapted, under flexing movement of said diaphragm, to first engage the seat at one point and then to gradually and progressively engage the remainder of the seat on both sides of said point until complete contact all the way around the seat is made.

DONALD G. GRISWOLD.

References Cited in the file of this patent

UNITED STATES PATENTS

| Number | Name | Date |
|---|---|---|
| 1,803,958 | Cadwell | Jan. 31, 1928 |
| 1,964,921 | Lundberg | July 3, 1934 |
| 2,040,580 | Vorech | May 12, 1936 |
| 2,211,212 | Langdon | Aug. 13, 1940 |
| 2,223,944 | Ray | Dec. 3, 1940 |
| 2,307,066 | Paulus | Jan. 5, 1943 |
| 2,394,911 | Griswold | Feb. 12, 1946 |
| 2,462,189 | Hess | Feb. 22, 1949 |

FOREIGN PATENTS

| Number | Country | Date |
|---|---|---|
| 87,392 | Sweden | June 20, 1935 |